United States Patent
Chonan (10) Patent No.: US 7,427,248 B2
(45) Date of Patent: Sep. 23, 2008

(54) CONTINUOUSLY VARIABLE TRANSMISSION

(75) Inventor: Mitsugi Chonan, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 67 days.

(21) Appl. No.: 10/825,690

(22) Filed: Apr. 16, 2004

(65) Prior Publication Data
US 2004/0224806 A1    Nov. 11, 2004

(30) Foreign Application Priority Data
Apr. 18, 2003    (JP)    ............ 2003-114733

(51) Int. Cl.
*F16H 57/04* (2006.01)
(52) U.S. Cl. .......... 474/93; 474/150
(58) Field of Classification Search .......... 474/17, 474/18, 28, 46, 93, 148–150; 74/606 A
See application file for complete search history.

(56) References Cited

U.S. PATENT DOCUMENTS

| | | | | |
|---|---|---|---|---|
| 3,467,177 A | * | 9/1969 | Hoddinott | 165/47 |
| 4,493,677 A | * | 1/1985 | Ikenoya | 474/93 |
| 4,631,977 A | * | 12/1986 | Kawashima | 74/606 A |
| 4,671,782 A | * | 6/1987 | Ochiai et al. | 474/93 |
| 5,976,044 A | * | 11/1999 | Kuyama | 474/93 |
| 6,267,700 B1 | * | 7/2001 | Takayama | 474/93 |

FOREIGN PATENT DOCUMENTS

| | | |
|---|---|---|
| CA | 1250528 | 2/1989 |
| JP | 11-11171 | 1/1999 |

OTHER PUBLICATIONS

Canadian Patent Office—Office Action dated Dec. 6, 2007 for CA 2464931 (2 pages).

* cited by examiner

*Primary Examiner*—Richard W L Ridley
*Assistant Examiner*—James Pilkington
(74) *Attorney, Agent, or Firm*—Smith, Gambrell & Russell, LLP

(57) ABSTRACT

Cooling efficiency of cooling air is enhanced and durability of a continuously variable transmission is improved. The continuously variable transmission to be mounted on a vehicle has a transmission case. A primary pulley driven by an engine and a primary pulley linked to drive wheels are rotatably accommodated in the transmission case. A V-belt is provided to extend for winging between the primary pulley and the secondary pulley, and the rotation of the primary pulley is continuously changed and transmitted to the secondary pulley. Fan blades are formed in the primary pulley, and a scroll surface is formed in transmission case from an intake region of the cooling air toward a discharge region thereof so as to gradually away from top faces of the fan blades in a radial-outer direction. Thereby, blowing efficiency of the cooling air can be enhanced and an interior of the transmission case can be sufficiently cooled, whereby the durability of the V-belt can be enhanced.

28 Claims, 5 Drawing Sheets

FIG. 5 ing an engine power outputted from the engine unit 10.

CONTINUOUSLY VARIABLE TRANSMISSION

BACKGROUND OF THE INVENTION

The present invention relates to a continuously variable transmission to be mounted on a vehicle and, specifically, to a technique effectively applied to a continuously variable transmission having a rubber drive belt.

A belt-driven continuously variable transmission (CVT) applied to a power transmission system of the vehicle has a primary pulley provided on an input shaft and a secondary pulley provided on an output shaft, wherein the drive belt is provided to extend for winding between the two pulleys. By changing the contact diameter of the drive belt, a rotation speed transmitted from the input shaft to the output shaft is changed continuously.

In such a continuously variable transmission, the contact diameter of the drive belt is changed. Therefore, there are a hydraulic type one in which a groove width of the primary pulley is variably controlled by hydraulic pressure in accordance with a run condition, and a weight type one in which a groove width of the primary pulley is variably controlled by centrifugal weight in accordance with the rotation speed of the primary pulley.

The hydraulic-type continuously variable transmission is more suitable than the weight-type one to high-precisely control a transmission gear ratio depending on the run condition. However, the hydraulic-type continuously variable transmission requires a hydraulic control device, which performs hydraulic control in accordance with the run condition of the vehicle, so that adoption of the hydraulic-type continuously variable transmission involves cost increase. In contrast, the weight-type continuously variable transmission is capable of being changed in accordance with the rotation speed of the primary pulley, so that its construction is simple and, consequently, the manufacturing costs of the continuously variable transmission can be reduced. For these reasons, the weight-type continuously variable transmission is mounted on all terrain vehicles (ATVs) and two-wheel vehicles, etc. in many cases.

A rubber drive belt is built in the weight-type continuously variable transmission, and the drive belt requires being cooled for preventing its deterioration and improving its durability. Therefore, there has been developed a continuously variable transmission in which, by providing fan blades on the primary pulley, cooling air is blown into a case in which the pulley and drive belt are accommodated (see, for example, Japanese Patent Laid-open (TOKUKAIHEI) 11-11171).

SUMMARY OF THE INVENTION

However, the diameter sizes of the primary pulley and secondary pulley on which the fan blades are formed are limited, and the length of each fan blade has been difficult to increase. Particularly, to increase the length of each fan blade beyond the diameter size of each pulley and/or to increase the width size of each fan blade lead to the unnecessarily jumbo-sized continuously variable transmission.

Since the jumbo-sizing of the fan blades to be formed on the pulleys is thus restricted, it is difficult to increase a flow rate of the cooling air for cooling a interior of the case. Therefore, the drive belt cannot be sufficiently cooled, whereby there is the problem that the durability of the drive belt is degraded.

An object of the present invention is to improve the durability of a continuously variable transmission by sufficiently cooling the interior of the case of the continuously variable transmission.

A continuously variable transmission continuously according to the present invention, which changes rotation of a primary pulley driven by an engine and transmits the rotation to a secondary pulley through a drive belt, comprises: a fan blade sending cooling air to said pulleys and said belt and provided to at least one of said primary pulley and said secondary pulley; and a scroll surface formed in a case rotatably accommodating said primary pulley and said secondary pulley from an intake region of the cooling air toward a discharge region thereof so as to gradually away from a top face of said fan blade in a radial-outer direction.

A continuously variable transmission according to the present invention claim further comprises: an intake port for introducing the cooling air into said case; and an exhaust port for exhausting the cooling air therefrom, wherein the intake and exhaust ports are formed in said case.

A continuously variable transmission according to the present invention further comprises: an unidirectional airflow plate provided in said case and making unidirectional the cooling air introduced onto said scroll surface to a rotational direction of said fan blade.

According to the present invention, the scroll surface is formed from the cooling-air intake region to the cooling-air discharge region so as to be gradually away from the top faces of the fan blades. Consequently, back pressure disturbing the flow of the discharged cooling air can be suppressed, whereby the blowing efficiency of the cooling air can be enhanced.

Therefore, since the interior of the case can be sufficiently cooled, the durability of the drive belt can be enhanced and the durability of continuously variable transmission can be also enhanced.

DESCRIPTION OF THE PREFERRED EMBODIMENTS

Figure 1:
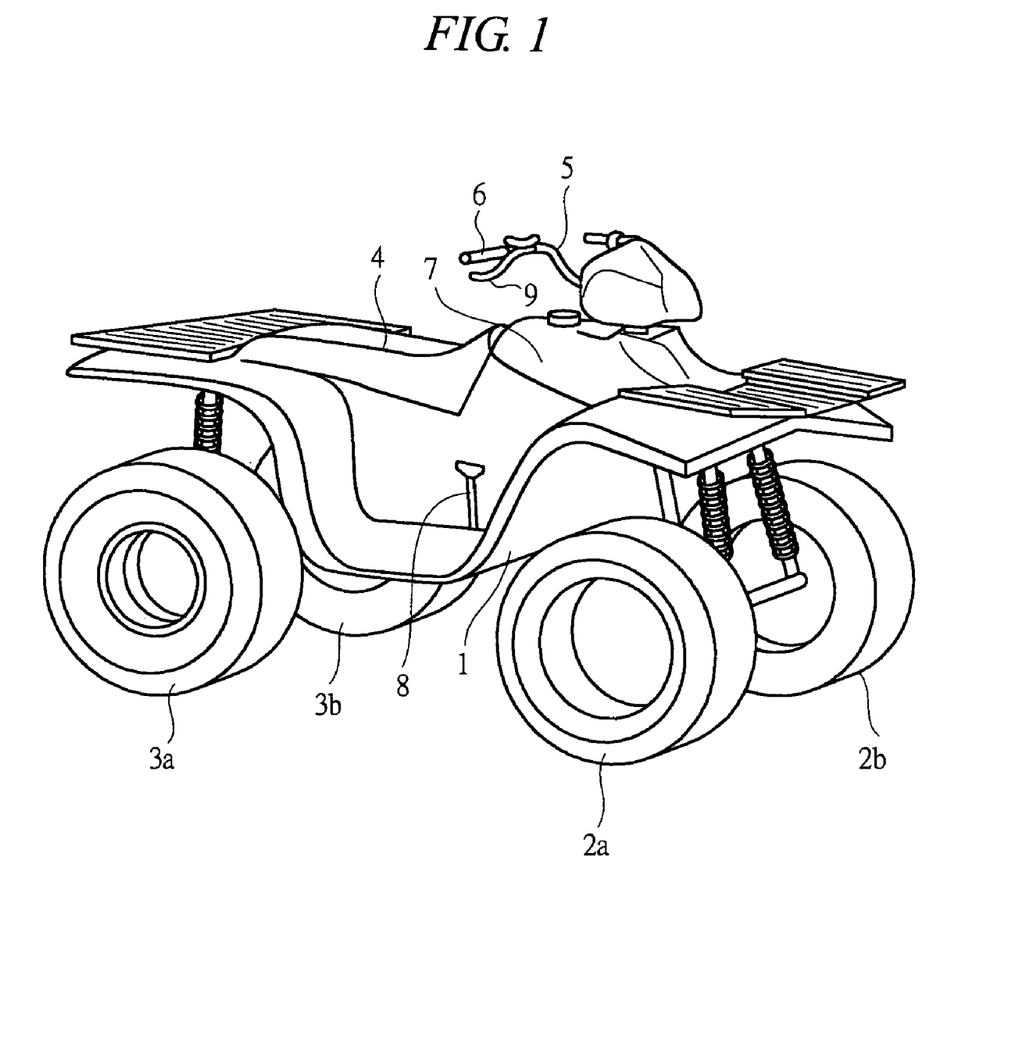
FIG. 1 is a perspective view showing a vehicle.

Hereinafter, an embodiment of the present invention will be detailed with reference to the drawings. FIG. 1 is a perspective view showing a vehicle, and this vehicle is an ATV generally called a "buggy", namely, an unleveled-ground traveling vehicle. As shown in FIG. 1, a vehicle body 1 is provided with front wheels 2a and 2b and rear wheels 3a and 3b, and a saddle-type seat 4 is provided in a central portion of the vehicle body 1. A rider rides on the vehicle by straddling the seat 4 and operates a steering handle 5 to make the vehicle run.

Figure 2:
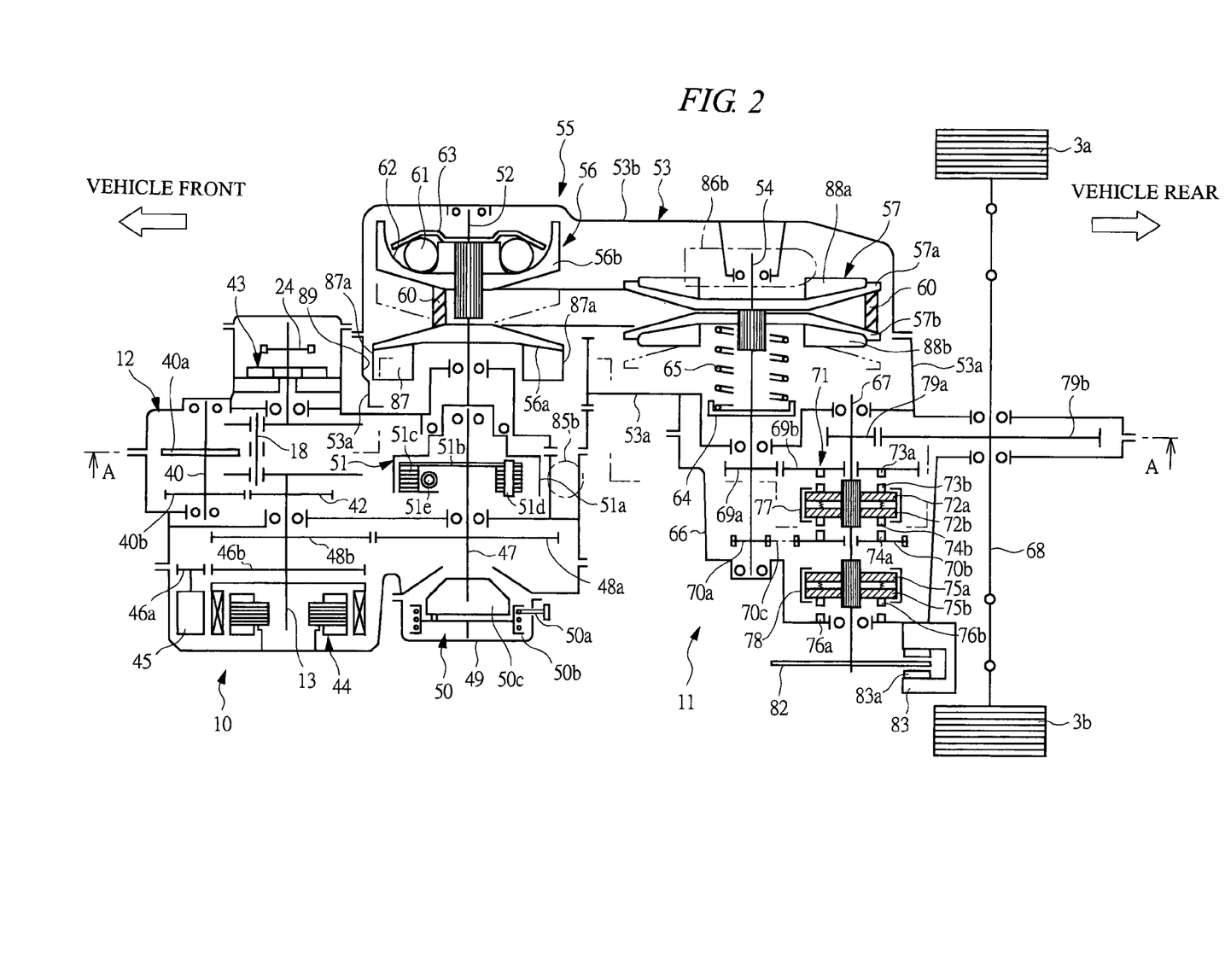
FIG. 2 is a schematic view showing an engine unit and a drive unit that are mounted in the vehicle.
Figure 3:
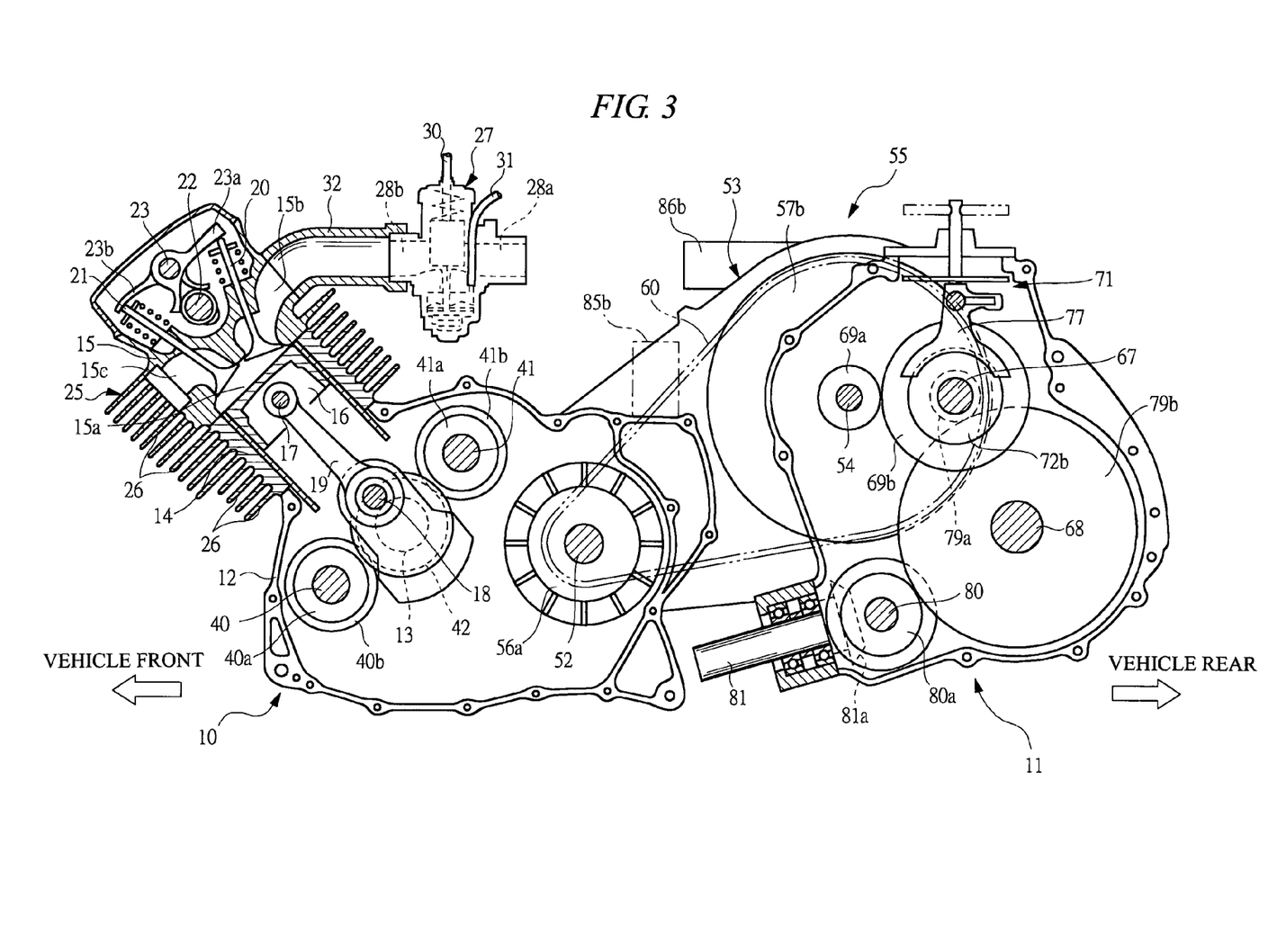
FIG. 3 is a cross-sectional view taken along line A-A of FIG. 2.

FIG. 2 is a schematic view showing an engine unit 10 and a drive unit 11 that are mounted in the vehicle in FIG. 1. FIG. 3 is a cross-sectional view taken along line A-A of FIG. 2. As shown in FIGS. 2 and 3, the engine unit 10 for outputting an engine power is provided on a vehicle-front side. On a vehicle-rear side, there is provided the drive unit 11 transmitting the engine power to drive wheels via a continuously variable transmission 55 according to an embodiment of the present invention.

As shown in FIG. 2, a crankshaft 13 is rotatably accommodated via a bearing in a crankcase 12 of the engine unit 10. Additionally, as shown in FIG. 3, a cylinder 14 is attached to an opening formed on the crankcase 12, and a cylinder head 15 is mounted on an upper end face of the cylinder 14. A piston 16 is reciprocatably built in a cylinder bore formed in the cylinder 14. A piston pin 17 attached to the piston 16 and a crank pin 18 fixed to the crankshaft 13 to be eccentric to a rotational center of the crankshaft 13 are linked to each other via a connecting rod 19.

In the cylinder head 15, a combustion chamber 15a is formed, and an intake port 15b and an exhaust port 15c are formed to open to the combustion chamber 15a. An intake valve 20 is built in the cylinder head 15 so that the intake port 15b and the combustion chamber 15a can be shifted from communication conditions to cutoff conditions or vice versa. An exhaust valve 21 is built in the cylinder head 15 so that the intake port 15b and the combustion chamber 15a can be shifted from communication conditions to cutoff conditions or vice versa.

Additionally, a camshaft 22 having two cam surfaces is rotatably mounted in the cylinder head 15. On a locker shaft 23 provided in parallel thereto, a locker arm 23a for open/close-driving the intake valve 20 and a locker arm 23b for open/close-driving the exhaust valve 21 are rotatably mounted. An unshown timing chain is provided to extend for winding between an unshown sprocket fixed to the camshaft 22 and a sprocket 24 shown in FIG. 2 and fixed to an end of the crankshaft 13, whereby the camshaft 22 is rotate-driven in synchronization with the rotation of the crankshaft 13. The cam surface of the camshaft 22 is made to contact with one ends of the locker arms 23a and 23b in accordance with rotation positions of the crankshaft 13, that is, displacement positions of the piston 16. Accordingly, each of the intake valve 20 and the exhaust valve 21 is open/close-driven at a predetermined timing.

An engine 25 including the above-mentioned crankcase 12, cylinder 14, and cylinder head 15 is mounted on the vehicle body 1 so that the crankshaft 13 is faced in a vehicle-width direction. The engine 25 is a single-cylinder air-cooled engine, and heat-releasing fins 26 are formed on the cylinder 14 and the cylinder head 15.

A carburetor 27 is disposed on the vehicle-rear side of the engine 25 since the engine 25 is driven by supplying an air-fuel mixture to the engine 25. An input port 28a of the carburetor 27 is connected to an unshown air cleaner, and an output port 28b of the carburetor 27 is connected via an intake pipe 32 to the intake port 15b of the cylinder head 15. One end of a throttle cable 30 is assembled to the carburetor 27, and the other end of the throttle cable 30 is assembled to an acceleration grip 6 shown in FIG. 1. Additionally, a fuel hose 31 for guiding fuel from a fuel tank 7 shown in FIG. 1 is connected to the carburetor 27.

The air-fuel mixture guided from the carburetor 27 to the intake port 15b in accordance with a rider's operation of the acceleration grip 6 is fed into the combustion chamber 15a in an intake stroke in which the intake valve 20 is open-driven, and is converted to the engine power by burning through a compression stroke and a combustion stroke. The burned air-fuel mixture becomes an exhaust gas and is exhausted, in an exhaust stroke, from the exhaust port 15c to the outside through an unshown exhaust pipe. The piston 16 pushed down due to the burning of the air-fuel mixture rotate-drives the crankshaft 13 via the connecting rod 19, whereby the engine power is output to the drive unit 11 described below.

As shown in FIG. 3, two balancer shafts 40 and 41 are rotatably attached to the crankcase 12 via bearings. Balancer weights 40a and 41a are integrally provided on the balancer shafts 40 and 41, respectively. Gears 40b and 41b provided on the respective balancer shafts 40 and 41 engage with a gear 42 provided on the crankshaft 13, whereby a rotational deviation of the crankshaft 13 is absorbed by the balancer weights 40a and 41a. Note that, in FIG. 2, the balancer shaft 40 that is one of the two balancer shafts is shown.

An oil pump 43 driven by the crankshaft 13 is provided to the one end of the crankshaft 13, and lubricating oil discharged from the oil pump 43 is supplied to a sliding portion of the drive unit 11 through an unshown oil path. Further, an electric generator 44 driven by the crankshaft 13 is provided to the other end of the crankshaft 13, and electric power generated by the electric generator 44 charges an unshown battery. Additionally, a starter motor 45 is provided to be adjacent to the electric generator 44, whereby the rotation of the starter motor 45 driven at an engine start is transmitted to the crankshaft 13 via gears 46a and 46b.

As shown in FIG. 2, in the crankcase 12, a countershaft 47 is rotatable mounted in parallel to the crankshaft 13. A gear 48a provided on the countershaft 47 engages with a gear 48b provided on the crankshaft 13, whereby the rotation of the crankshaft 13 is transmitted to the countershaft 47. A recoil cover 49 is built in the crankcase 12 disposed on one end side of the countershaft 47. In the recoil cover 49, there is mounted a recoil starter 50 used for starting manually the engine 25 on the case where the engine 25 is difficult to start up due to lack of the power amount charged in the buttery. The recoil starter 50 has: a recoil pulley 50b, which is accommodated in the recoil cover 49 and around which a recoil rope 50a is wound; and a recoil drum 50c attached to the countershaft 47. Since the recoil pulley 50b is rotated by pulling the recoil rope 50a, the crankshaft 13 is rotated via the countershaft 47 and therefore the engine 25 can be started.

Also, a centrifugal clutch 51 is attached to the other end of the countershaft 47. The centrifugal clutch 51 has a clutch drum 51a rotatably mounted in the crankcase 12 and a rotary plate 51b fixed to the countershaft 47. A plurality of arcuate clutch shoes 51c are mounted on the rotary plate 51b. Each of the clutch shoes 51c is rotatable via a pin 51d attached to one end thereof. A tensile coil spring 51e is attached to the other end of the clutch shoe 51c, whereby a spring force is exerted on the clutch shoe 51c in such a direction as to be away from an inner circumferential surface of the clutch drum 51a. Accordingly, when the rotation speed of the countershaft 47 exceeds a predetermined one, a centrifugal force applied to the clutch shoe 51c exceeds the spring force, whereby the clutch shoe 51c engages with the inner circumferential surface of the clutch drum 51a and the centrifugal clutch 51 becomes in a fastening condition. Consequently, the engine power from the crankshaft-13 is transmitted to the clutch drum 51a via the countershaft 47, and the engine power is input from the clutch drum 51a into the continuously variable transmission 55.

The continuously variable transmission 55 has a transmission case 53 assembled in the crankcase 12, and the transmission case 53 comprises a case body 53a and a case cover 53b. A primary shaft 52 fixed to the clutch drum 51a and a secondary shaft 54 placed in parallel to the primary shaft 52 are rotatably accommodated in the transmission case 53.

Further, the continuously variable transmission 55 includes a primary pulley 56 provided on the primary shaft 52 and a secondary pulley 57 provided on the secondary shaft 54.

The primary pulley 56 has a conical-surface-shaped fixing sheave 56a and a conical-surface-shaped moving sheave 56b opposite to the fixing sheave 56a. The fixing sheave 56a is fixed to the primary shaft 52, and the moving sheave 56b is movably attached axially to a spline provided on the primary shaft 52. Meanwhile, the secondary pulley 57 has a conical-surface-shaped fixing sheave 57a and a conical-surface-shaped moving sheave 57b opposite to the fixing sheave 57a. The fixing sheave 57a is fixed to the secondary shaft 54. The moving sheave 57b is movably attached axially to a spline provided on the secondary shaft 54.

A V-belt 60 serving as a rubber drive belt is provided to extend for winding between the primary pulley 56 and the secondary pulley 57. When a contact diameter of the V-belt 60 with regard to the primary pulley 56 and the secondary pulley 57 is changed, the rotation speed of the primary shaft 52 is continuously changed and transmitted to the secondary shaft 54. On the moving sheave 56b of the primary pulley 56, a plurality of columnar centrifugal weights 61, for example, six column centrifugal weights 61 facing perpendicularly to the rotational center of the primary shaft 52 are mounted. A cam surface 62 corresponding to each surface of the centrifugal weights 61 is formed on the moving sheave 56b. The cam surface 62 is formed so that a radial-outer side portion of the moving sheave 56b protrudes toward an end of the primary shaft 52. A cam plate 63 is fixed to the primary shaft 52 so as to be opposite to the cam surface 62, and a radial-outer side portion of the cam plate 63 inclines so as to approach to the cam surface 62. Meanwhile, a spring seat 64 is fixed to the secondary shaft 54. A compression coil spring 65 for applying a fastening force to the V-belt 60 is mounted between the spring seat 64 and the moving sheave 57b.

As the rotation speed of the primary shaft 52 is increased, a centrifugal force exerted on each of the centrifugal weights 61 is increased in strength. Therefore, each centrifugal weight 61 moves in a radial-outer direction while pushing and extending a space between the moving sheave 56b and the cam plate 63. In this case, since the cam plate 63 is fixed to the primary shaft 52, the moving sheave 56b approaches toward the fixing sheave 56a due to the movement of the centrifugal weights 61. For this reason, since the groove width of the primary pulley 56 is narrowed, the contact diameter of the V-belt 60 with regard to the primary pulley 56 becomes large. Meanwhile, since the groove width of the secondary pulley 57 is enlarged against the spring force due to the V-belt 60, the contact diameter of the V-belt 60 with regard to the secondary pulley 57 becomes small. In other words, as the rotation speed of the primary shaft 52 increases, the speed ratio of the continuously variable transmission 55 is shifted to a high-speed side.

Further, when the rotation speed of the primary shaft 52 is reduced and the centrifugal force to be exerted on each centrifugal weight 61 becomes small in strength, the groove width of the secondary pulley 57 is narrowed by the spring force exerted on the secondary pulley 57. Therefore, the contact diameter of the V-belt 60 with regard to the secondary pulley 57 becomes large. Meanwhile, since the groove width of the primary pulley 56 is enlarged due to the V-belt 60, the contact diameter of the V-belt 60 with regard to the primary pulley 56 becomes small. That is, as the rotation speed of the primary shaft 52 reduces, the speed ratio of the continuously variable transmission 55 is shifted to a low-speed side.

One end of the secondary shaft 54 protrudes from the transmission case 53, and is supported via bearings in a gear case 66 built in the transmission case 53. In the gear case 66, an output shaft 67 is rotatably accommodated parallel to the secondary shaft 54 and, simultaneously, a wheel shaft 68 is rotatably mounted parallel to the output shaft 67.

A forward gear 69a is integrally provided on the secondary shaft 54, wherein the forward gear 69a engages always with a gear 69b rotatably mounted on the output shaft 67. Additionally, a rearward sprocket 70a is integrally provided on the secondary shaft 54, wherein a chain 70c is provided to extend for winding between the rearward sprocket 70a and a sprocket 70b rotatably mounted on the output shaft 67. Accordingly, a rotational direction of the gear 69b gear-driven by the power supplied from the secondary shaft 54 is opposite to that of the secondary shaft 54, and the rotational direction of the chain-driven sprocket 70b is identical with that of the secondary shaft 54.

Further, a forward/rearward shift mechanism 71 is mounted between the gear 69b and the sprocket 70b. In response to a shift operation of the forward/rearward shift mechanism 71, the powers supplied from the gear 69b and the sprocket 70b are selectively transmitted to the output shaft 67. The forward/rearward shift mechanism 71 has a pair of shift discs 72a and 72b that engage with the respective splines of the output shaft 67. The shift discs 72a and 72b are axially slidable on the output shaft 67. Engagement gear teeth 73b, which engage with engagement gear teeth 73a provided on a side face of the gear 69b, are provided on the shift disc 72a, and engagement gear teeth 74b, which engage with engagement gear teeth 74a provided on a side face of the sprocket 70b, are provided on the shift disc 72b. Accordingly, when the pair of shift discs 72a and 72b are moved toward the gear 69b and the engagement gear teeth 73a and 73b are engaged with one another, the rotation of the secondary shaft 54 is transmitted to the output shaft 67 via the forward gears 69a and 69b. Meanwhile, when the shift discs 72a and 72b are moved toward the sprocket 70b and the engagement gear teeth 74a and 74b are engaged with one another, the rotation of the secondary shaft 54 is transmitted to the output shaft 67 via the rearward sprockets 70a and 70b. Note, as shown in FIG. 2, if each of the shift discs 72a and 72b is not engaged with any of the engagement gear teeth, linkage between the secondary shaft 54 and the output shaft 67 is cut off.

Additionally, a pair of shift discs 75a and 75b engaging with the respective splines of the output shaft 67 are slidably attached axially to the output shaft 67. Engagement gear teeth 76b, which engage with engagement gear teeth 76a provided on the gear case 66, are proved on the shift disc 75b. Accordingly, when the shift discs 75a and 75b are moved toward the gear case 66 and the engagement gear teeth 76a and 76b are engaged with one another, the output shaft 67 and the gear case 66 are fastened, whereby the rotation of the output shaft 67 is restricted. Meanwhile, as shown in FIG. 2, when the engaging of the engagement gear teeth 76a and 76b is released, the output shaft 67 becomes in a rotatable state.

The shifting of such shift discs 72a, 72b, 75a, and 75b is carried out by shift holders 77 and 78. The shift holders 77 and 78 are linked via an unshown operation link to a shift lever 8 shown in FIG. 1. The shift discs 72a, 72b, 75a, and 75b are shifted by the operation of the shift lever 8 by the rider. In the shift lever 8, there are set: an F position corresponding to a forward run; an R position corresponding to a rearward run; an N position corresponding to a neutral mode of the drive unit 11; and a P position corresponding to a parking mode of the vehicle.

If the shift lever 8 is operated and shifted to the F position, the engagement gear teeth 73b of the shift disc 72a are engaged with the engagement gear teeth 73a of the gear 69b and the shift discs 75a and 75b are each shifted to a neutral position. Further, when the shift lever is operated and shifted to the R position, the engagement gear teeth 74*b* of the shift disc 72*b* are engaged with the engagement gear teeth 74*a* of the sprocket 70*b* and the shift discs 75*a* and 75*b* each become at a neutral position. Further, when the shift lever is operated and shifted to the N position, all the shift discs 72*a*, 72*b*, 75*a*, and 75*b* become at the neutral positions. When the shift lever is operated and shifted to the P position, the shift discs 72*a* and 72*b* each become at the neutral position and the engagement gear teeth 76*b* of the shift disc 75*b* are engaged with the engagement gear teeth 76*a* of the gear case 66.

A gear 79*a* is fixed to the output shaft 67 to which the power is transmitted in accordance with the operation of the above-mentioned shift lever 8, and a gear 79*b* always engaging with the gear 79*a* is fixed to wheel shaft 68. Rear wheels 3*a* and 3*b* are linked to both ends of the wheel shaft 68, and the rear wheels 3*a* and 3*b* serving as drive wheels are driven by the wheel shaft 68. Note that, as shown in FIG. 3, a drive shaft 80 driving the front wheels 2*a* and 2*b* and provided with a gear 80*a* engaging with the gear 79*b* is rotatably supported by the transmission case 53 and the gear case 66 and that a front-wheel output shaft 81 linked to the drive shaft 80 via a bevel gear 81*a* is rotatably supported by the gear case 66. Thus, the power from the output shaft 67 is transmitted to the front-wheel output shaft 81 via the drive shaft 80, so that the front wheels 2*a* and 2*b* are driven together with the rear wheels 3*a* and 3*b*.

Additionally, to brake the vehicle at the time of a run, a brake disc 82 is mounted on the output shaft 67, as shown in FIG. 2. To the gear case 66, there is attached a brake caliper 83 engaging a brake pad 83*a* with the brake disc 82. The brake caliper 83 is driven in the manner that the rider operates a brake lever 9 provided to the steering handle 5, whereby a braking force can be applied to the output shaft 67.

Figure 4:
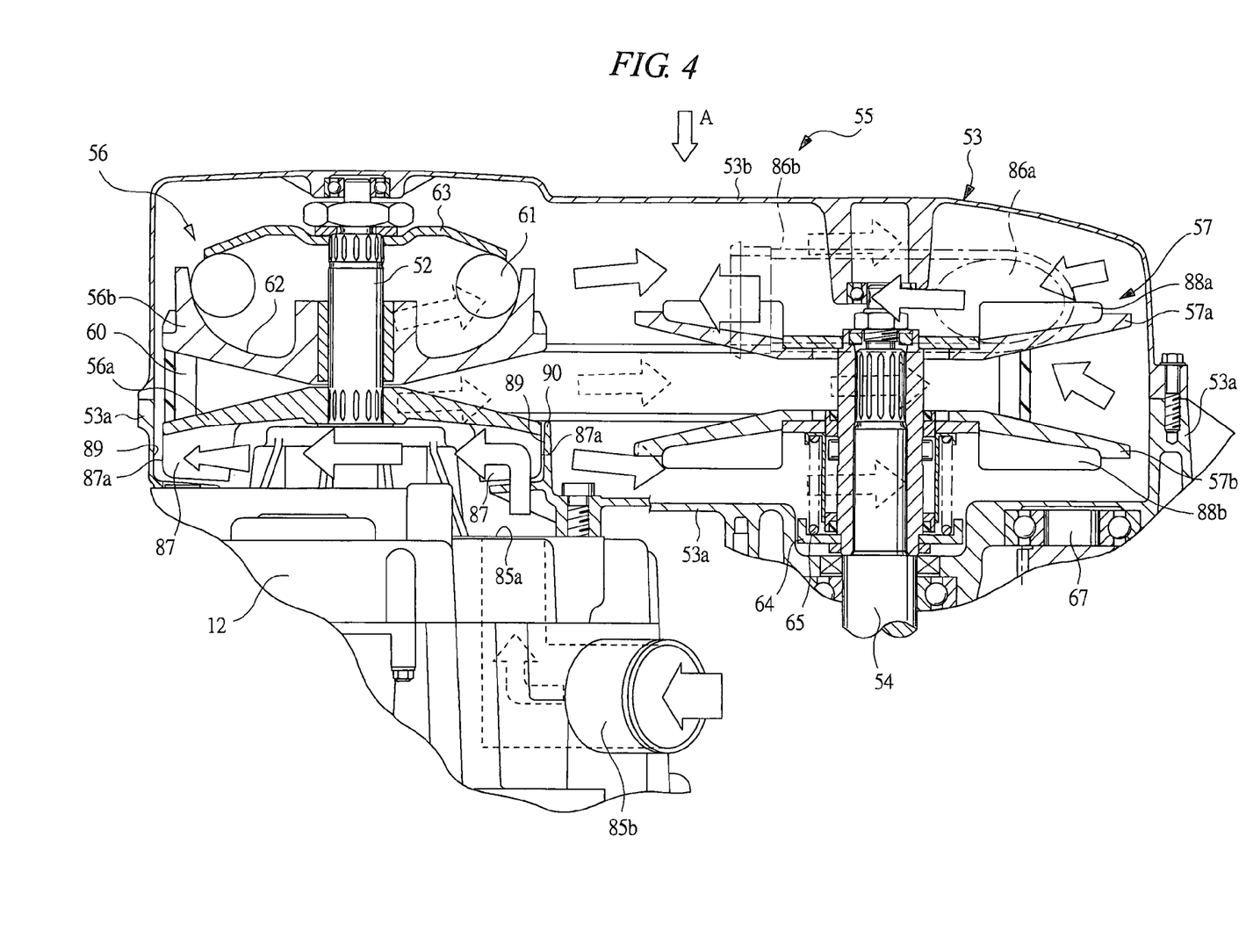
FIG. 4 is a partially enlarged cross-sectional view showing a continuously variable transmission shown in FIG. 2.
Figure 5:
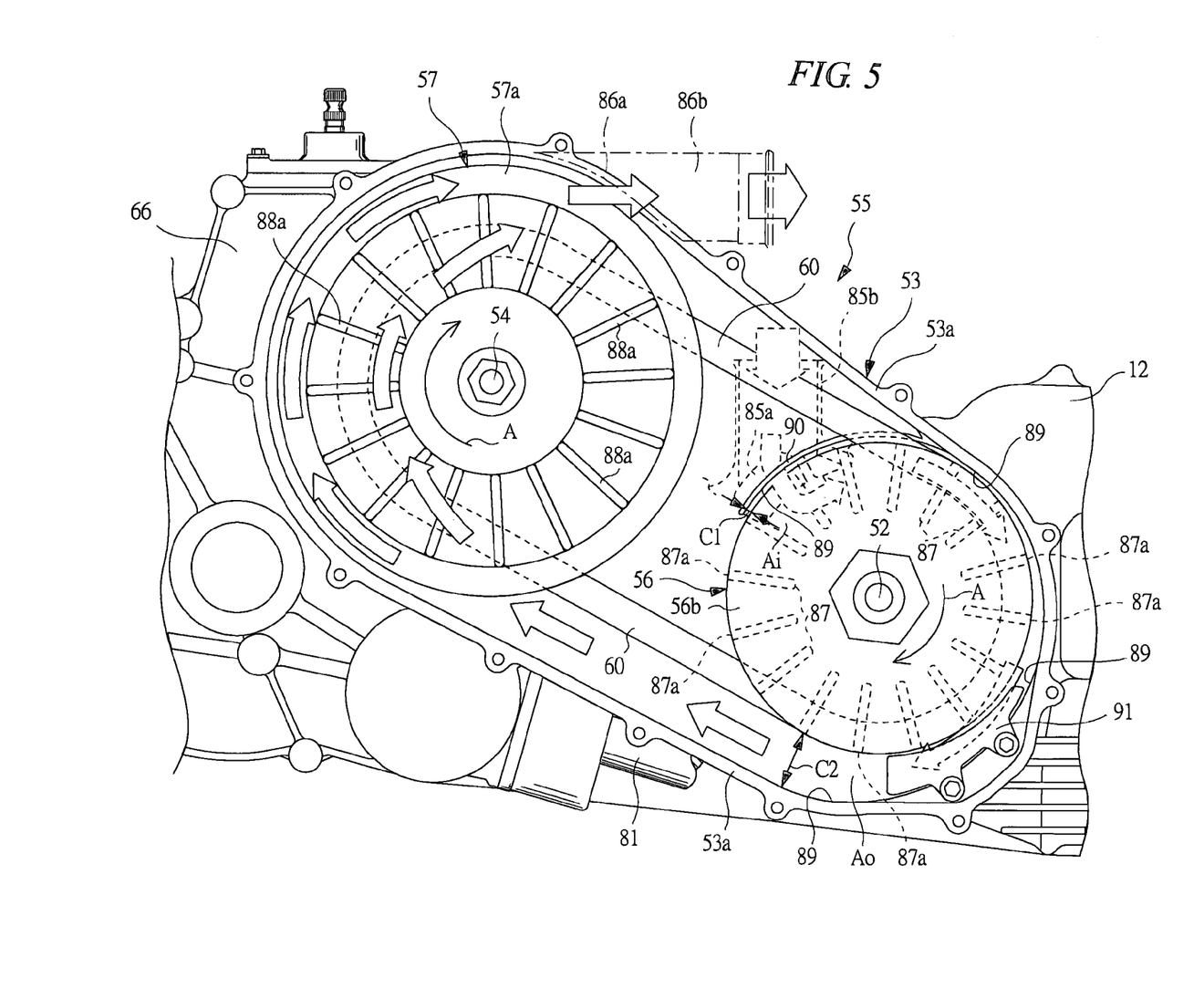
FIG. 5 is a side view showing the continuously variable transmission as viewed from arrow A of FIG. 4.

Next, a cooling structure for the continuously variable transmission 55 will be described. FIG. 4 is a partially enlarged cross-sectional view showing the continuously variable transmission 55 shown in FIG. 2. FIG. 5 is a side view showing the continuously variable transmission 55 as viewed from arrow A of FIG. 4 and illustrates the condition where the case cover 53*b* is released. Note that outline arrows on a colored background, as illustrated in FIGS. 4 and 5, indicate flow directions of cooling the air flowing in the transmission case 53, and arrows "A" illustrated in FIG. 5 indicate respective rotational directions of the pulleys 56 and 57.

As shown in FIGS. 4 and 5, outside air is introduced as the cooling air into the transmission case 53 in order to cool the primary pulley 56, the secondary pulley 57, and the V-belt 60 that constitute the continuously variable transmission 55. Into the case body 53*a* of the transmission case 53, an intake port 85*a* is formed to introduce the cooling air. The intake port 85*a* communicates with the outside, from a flow passage in the crankcase 12, via an intake duct 85*b*. Further, an exhaust port 86*a* for exhausting the cooling air is formed in the case cover 53*b* of the transmission case 53. The exhaust port 86*a* communicates with the outside, via an exhaust duct 86*b* formed in the case cover 53*b*. Note that unshown extension ducts are connected to the intake duct 85*b* and the exhaust duct 86*b*, whereby intrusion of water, dust, and the like into the transmission case 53 can be prevented.

To suck the cooling air from the intake port 85*a* into the transmission case 53 and to exhaust the cooling air having absorbed heat from the V-belt 60 and the like, a plurality of fan blades 87 are formed on a rear surface of the fixing sheave 56*a* of the primary pulley 56 so that they extend in a radial-outer direction. Additionally, fan blades 88*a* and 88*b* are formed on rear surfaces of the fixing sheave 57*a* and the moving sheave 57*b* of the secondary pulley 57 so that they extend in the radial-outer direction.

As shown in FIG. 5, a shroud wall 90 having a scroll surface 89 along top faces 87*a* of the fan blades 87 is formed in the case body 53*a* and near the intake port 85*a* formed in the case body 53*a* of the transmission case 53, more specifically, within an intake region Ai where the fan blades 87 suck the cooling air. The scroll surface 89 is smoothly and continually formed on an inner circumferential surface of the case body 53*a* from the shroud wall 90 toward a discharge region Ao where the fan blades 87 discharge the cooling air. More specifically, the scroll surface 89 is formed from the intake region Ai toward the discharge region Ao to be gradually away from the top faces 87*a* of the fan blades 87 in the radial-outer direction. That is, a clearance C1 is formed between the top faces 87*a* of the fan blades 87 and the scroll surface 89 in the intake region Ai while a clearance C2 larger than the clearance C1 is formed in the discharge region Ao.

As seen from FIGS. 4 and 5 the shroud wall 90 extends (e.g., for about a ¼ of the pulley's circumference) radially inward and away from the case's inner surface so as to have its free end fall within an interior region of the loop path defined by the belt, and such that the inner surface of the case extends to opposite sides of the shroud base. As further shown in FIGS. 4 and 5, the deviation of the shroud wall from the case (e.g., a monolithic arrangement) provides for the curvature conformance used in providing the noted clearance space in a first sub-region where the pulley is free of belt contact and a second sub-region where the pulley is in contact with the belt such that the scroll surface's clearance space defining curvature conformance to the pulley is extended in length.

Also, a unidirectional-airflow plate 91 for making unidirectional the cooling air guided onto the scroll surface 89 is formed in the discharge region Ao of the case body 53*a*. The unidirectional-airflow plate 91 is attached in such a manner as to partition a flow path of the cooling air flowing between the top faces 87*a* of the fan blades 87 and the scroll surface 89, whereby the cooling air can be prevented from diffusing unnecessarily by making unidirectional the cooling air in the rotational direction of the fan blades 87.

Subsequently, a cooling process using the cooling air flowing in the transmission case 53 during the driving of the continuously variable transmission 55 will be described. After the engine 25 is started by the operation of the starter motor 45, the vehicle is shifted to a forward-run condition by the rider's operation of shifting the shift lever 8 to the F position. Under such a condition, since the acceleration grip 6 is operated, the centrifugal clutch 51 is shifted to the fastening condition as the engine speed is raised and the vehicle starts a forward run.

As shown in FIG. 5, in the run condition of the vehicle, the primary pulley 56 is rotate-driven in the direction of the arrow A and the secondary pulley 57 is also rotate-driven in the direction of the arrow A. Concurrently, the cooling air is sent from the intake port 85*a* of the transmission case 53 to the exhaust port 86*a* by the fan blades 87, 88*a*, and 88*b* formed on the respective pulleys 56 and 57. Note that even in the rear-run condition, since the pulleys 56 and 57 rotate in the direction of the arrow A, the cooling air is similarly sent also in the rear-run condition.

First, the cooling air collected by the fan blades 87 in the intake region Ai of the primary pulley 56 is pressurized and sent to the discharge region Ao by the rotation drive of the primary pulley 56 and, then, sent from the discharge region Ao to the secondary pulley 57. At this time, the fan blades 87 can securely collect the cooling air having passed through the intake port 85*a* by using the scroll surface 89 of the intake region Ai formed along the top faces 87*a* of the fan blades 87. Additionally, by the scroll surface 89 formed from the intake region A1 toward the discharge region Ao so as to be gradually away from the top faces 87*a* of the fan blades 87, back pressure disturbing the flow of the cooling air discharged from the fan blades 87 can be suppressed, whereby blowing efficiency of the cooling air can be enhanced. Further, since the unidirectional-airflow plate 91 prevents the cooling air from unnecessarily diffusing, the cooling air can be securely supplied to the secondary pulley 57.

Next, as shown in FIG. 4, the cooling air discharged from the fan blades 87 of the primary pulley 56 flows to the secondary pulley 57 while spreading in the transmission case 53 in the width direction. After cooling the primary pulley 56, the secondary pulley 57, and the V-belt 60 that have generated heat due to friction generated at the time of transmitting the power, the cooling air is exhausted to the outside through the exhaust port 86*a*. Even when the cooling air is exhausted through the exhaust port 86*a*, the cooling air is sent toward the exhaust port 86*a* by the fan blades 88*a* and 88*b* formed on the secondary pulley 57. Consequently, since a pressure rise around the secondary pulley 57 can be suppressed, the blowing efficiency of the cooling air can be further enhanced.

As described above, since the blowing efficiency of the cooling air flowing in the transmission case 53 is enhanced, the primary pulley 56, the secondary pulley 57, and the V-belt 60 can be sufficiently cooled and the durability of the continuously variable transmission 55 can be improved. Particularly, in the continuously variable transmission 55 having the rubber V-belt 60 whose deterioration is accelerated by heat, the durability of the V-belt 60 can be enhanced and the running costs of the continuously variable transmission 55 can be reduced. Additionally, the blowing efficiency of the cooling air can be enhanced without jumbo-sizing the fan blades 87, 88*a*, and 88*b*. Therefore, the jumbo-sizing and/or the cost increase of the continuously variable transmission 55 can be suppressed.

The present invention is not limited to the above-mentioned embodiment, and can be variously modified and altered without departing from the gist thereof. For example, although the continuously variable transmission 55 is mounted on the ATV, that is, the unleveled-ground traveling vehicle, the continuously variable transmission 55 may be mounted on a two-wheeled vehicle and the like.

Further, although the scroll surface 89 formed in the transmission case 53 is formed on a side of the primary pulley 56, the scroll surface 89 may be formed on a side of the secondary pulley 57. In this case, the scroll surface is formed in the vicinity of the exhaust port 86*a* which is within the discharge region of the secondary pulley 57 so as to be gradually away from the top faces of the fan blades 88*a* and 88*b*.

Additionally, in the above-mentioned embodiment, the cooling air is sent to the secondary pulley 57 from the primary pulley 56. However, the cooling air may be sent from the secondary pulley 57 to the primary pulley 56 by forming an intake port on the side of the secondary pulley 57 and forming an exhaust port on the side of the primary pulley 56.

Further, in the drawings, the respective fan blades 87, 88*a*, and 88*b* formed on the primary pulley 56 and the secondary pulley 57 are illustrated as linearly extending radial fans. However, such fan blades are not limited to the above-mentioned embodiment, and may be centrifugal fans arcuately formed to have convex surfaces in a rotational direction or may be multi-blade fans arcuately formed to have convex surfaces in the rotational direction.

Note that, in the above-mentioned embodiment, the fan blades 87, 88*a*, and 88*b* are formed on the primary pulley 56 and the secondary pulley 57, respectively. However, needless to say, the fan blades 87 may be formed only on the primary pulley 56, or the fan blades 88*a* and 88*b* may be formed only on the secondary pulley 57.

According to the present invention, the scroll surface is formed from the cooling-air intake region to the cooling-air discharge region so as to be gradually away from the top faces of the fan blades. Consequently, back pressure disturbing the flow of the discharged cooling air can be suppressed, whereby the blowing efficiency of the cooling air can be enhanced.

Therefore, since the interior of the case can be sufficiently cooled, the durability of the drive belt can be enhanced and the durability of continuously variable transmission can be also enhanced.

The entire disclosure of a Japanese Patent Application No. 2003-114733, filed on Apr. 18, 2003 including specification, claims, drawings and summary, on which the Convention priority of the present application is based, are incorporated herein by reference in its entirety.

What is claimed is:

1. A continuously variable transmission for transmitting a rotation of a primary pulley to a secondary pulley through a drive belt and continuously changing a speed ratio between the pulleys, the continuously variable transmission comprising:

a fan blade provided to at least one of said primary pulley and said secondary pulley;

a case rotatably accommodating said one of the pulleys;

a shroud wall formed about a circumference of said one of the pulleys;

a scroll surface formed on said shroud wall and said case about a circumference of said one of the pulleys;

an intake port for introducing a cooling air into said case; and a clearance in a radial direction of said one of the pulleys between an outermost end of said fan blade and said scroll surface increases with a rotational direction of said fan blade, wherein said shroud wall is positioned as to cover the outermost end of said fan blade such that a flow of said cooling air radially exiting from said outermost end of said fan blade is channeled by said shroud wall until reaching a case defined portion of said scroll surfaced, and wherein said shroud wall has a laterally extending interior surface which promotes the lateral passage of said cooling air exiting from said intake port into contact with said fan blade.

2. A continuously variable transmission according to claim 1, further comprising:

an exhaust port for exhausting the cooling air from said case, wherein the intake and exhaust ports are formed in said case.

3. A continuously variable transmission according to claim 1, further comprising:

an unidirectional airflow plate provided in said case and making unidirectional the cooling air introduced onto said scroll surface to said rotational direction of said fan blade.

4. A continuously variable transmission according to claim 3, wherein said unidirectional airflow plate is attached onto said scroll surface along said rotational direction of said fan blade.

5. A continuously variable transmission according to claim 1, wherein said clearance gradually increases over about a quarter of said one of pulleys.

6. A continuously variable transmission according to claim 1, further comprising:
an intake region for intaking said cooling air into said fan blade, wherein
said clearance gradually increases from said intake region.

7. A continuously variable transmission according to claim 6, wherein said intake port is formed near said intake region.

8. A continuously variable transmission according to claim 1, further comprising:
a discharge region for discharging a cooling air from said fan blade, wherein
said clearance gradually increases toward said discharge region.

9. A continuously variable transmission according to claim 1, wherein said scroll surface is formed on an inner surface of said case.

10. A continuously variable transmission according to claim 1, wherein said scroll surface is formed along where said one of pulleys and said drive belt contact to each other.

11. A continuously variable transmission according to claim 10, wherein said shroud wall has a curvature which follows along a region of said one of the pulleys which region includes a first sub-region wherein said pulley is in contact with the said drive belt and a second sub-region wherein said pulley is free from contact with said drive belt.

12. A continuously variable transmission according to claim 1, wherein said shroud wall is arranged independently from an inner surface of said case extending along said circumference of said one of pulleys.

13. A continuously variable transmission according to claim 1, wherein said shroud wall extends out from an inner surface of said case in forming said scroll surface.

14. A continuously variable transmission according to claim 1, wherein said shroud wall has a base provided on an interior surface of said case and a free end.

15. A continuously variable transmission according to claim 1, wherein said shroud wall and case represent a combination that is monolithic.

16. A continuously variable transmission according to claim 1, wherein said shroud wall curves about said one of the pulleys so as to extend within an interior region of a loop path defined by said belt and such that a free end of said shroud wall is located in a region of minimum spacing between said pulleys.

17. A continuously variable transmission according to claim 1, wherein an interior surface of said case extends to opposite sides of said shroud wall so as to have said shroud wall increase an amount of scroll surface conformance to a rotation travel path of an outer surface of said one of the pulleys.

18. A continuously variable transmission according to claim 1, wherein said shroud wall extends radially inward relative to an interior surface portion of said case from which said shroud wall extends.

19. A continuously variable transmission according to claim 1, further comprising:
an intake region for intaking the cooling air into said fan blade, wherein said intake region is positioned such that air exiting said intake port is directed laterally into contact with said one of the pulleys at a region located between radial interior and exterior edges of said fan blade.

20. A continuously variable transmission according to claim 1, wherein said scroll surface on said shroud wall and said case is continually formed by way of an interior surface of said shroud wall extending continuously into an interior surface of said case.

21. A continuously variable transmission for transmitting a rotation of a primary pulley to a secondary pulley through a drive belt and continuously changing a speed ratio between the pulleys, the continuously variable transmission comprising:
a fan blade provided to at least one of said primary pulley and said secondary pulley;
a case rotatably accommodating said one of the pulleys;
a shroud wall formed about a circumference of said one of the pulleys;
a scroll surface formed on said shroud wall and said case about a circumference of said one of the pulleys;
an intake port for introducing a cooling air into said case; and
a clearance in a radial direction of said one of pulleys between an outermost end of said fan blade and said scroll surface increases with a rotational direction of said fan blade,
wherein said intake port feeds cooling air initially into said case at a position adjacent said fan blade and such that said cooling air exiting from said intake port is laterally directed into contact with said fan blade, and
wherein said shroud wall has a laterally extending interior surface which promotes the lateral passage of said cooling air exiting from said intake port into contact with said fan blade.

22. A continuously variable transmission according to claim 21, further comprising:
an intake region for intaking the cooling air into said fan blade, wherein said intake region is positioned such that the cooling air exiting said intake port is directed laterally into contact with said one of the pulleys at a region located between radial interior and exterior edges of said fan blade.

23. A continuously variable transmission according to claim 21, wherein the scroll surface on said shroud wall and said case is continually formed by way of an interior surface of said shroud wall extending continuously into an interior surface of said case.

24. A continuously variable transmission according to claim 21, wherein said shroud wall extends laterally over said outermost end of said fan blade.

25. A continuously variable transmission according to claim 21, wherein said shroud wall is positioned as to completely cover over said outermost end of said fan blade.

26. A continuously variable transmission for transmitting a rotation of a primary pulley to a secondary pulley through a drive belt and continuously changing a speed ratio between the pulleys, the continuously variable transmission comprising:
a fan blade provided to at least one of said primary pulley and said secondary pulley;
a case rotatably accommodating said one of the pulleys;
a shroud wall formed about a circumference of said one of the pulleys;
a scroll surface formed on said shroud wall and said case about a circumference of said one of the pulleys;
an intake port for introducing a cooling air into said case; and
a clearance in a radial direction of said one of pulleys between an outermost end of said fan blade and said scroll surface increases with a rotational direction of said fan blade, wherein said scroll surface represents a continuous air flow channeling surface comprised of an interior surface of said shroud wall and an interior surface of a portion of said casing, with the interior surface of said shroud wall and the interior surface of the portion of said casing being continually formed by way of the interior surface of said shroud wall extending continuously into the interior surface of the portion of said casing.

27. A continuously variable transmission according to claim 26, wherein said shroud wall has a flow channeling interior surface which laterally extends, in an axial direction in common with an axial extension direction of a rotation axis of said one of the pulleys, across a radially peripheral outer edge of said fan blade as to fully cover over that outer edge of said fan blade.

28. A continuously variable transmission according to claim 26, wherein said shroud wall extends circumferentially about said pulley as to have a free end that falls internally between said pulleys and inward of a loop path of said drive belt.

* * * * *